3,287,276
STABLE MIXTURE CONTAINING DITHIONITES
Franz Poschmann and Alfons Janson, Ludwigshafen (Rhine), Germany, assignors to Badische Anilin- & Soda-Fabrik Aktiengesellschaft, Ludwigshafen (Rhine), Germany
No Drawing. Filed Dec. 5, 1963, Ser. No. 328,163
Claims priority, application Germany, Dec. 11, 1962, B 69,932
2 Claims. (Cl. 252—105)

This invention relates to mixtures of major amounts of dithionites and minor amounts of water-soluble macromolecular substances as stabilizing agents.

The salts of dithionous acid, particularly sodium dithionite, are widely used as bleaching agents and dyeing auxiliaries, as for example in the paper industry for bleaching groundwood and in the textile industry, inter alia, for bleaching grey cloths and for reducing or discharging dyes. These salts are usually stored and transported in their anhydrous form and added shortly before use, usually without having been previously dissolved, to the treatment liquor or to the groundwood.

Anhydrous dithionites are substantially stable in storage in closed vessels, but decompose very rapidly under the influence of water or moisture with the formation of sulfites, sulfates, dithionates, thiosulfates and elementary sulfur. The decomposition is particularly marked under the influence of small amounts of water, the dihydrate of the dithionite being first formed with vigorous evolution of heat. Since, when small amounts of water are present, the whole of the water is combined as dihydrate, the water cannot exert any temperature depressing effect, for example by evaporation. There is therefore a considerable local accumulation of heat and a corresponding rise in temperature. This naturally accelerates the secondary reactions of the decomposition so that the elementary sulfur formed may even be ignited. This is particularly to be expected if the temperature rises to 230° C. (the ignition temperature of sulfur) or higher.

It is known that the said rise in temperature can be minimised by diluting the anhydrous sodium dithionite with inert substances. Suitable inert diluents are alkaline reacting salts, such as sodium carbonate, sodium phosphate and sodium polyphosphate. However when a small amount of water is added to a mixture of 20% of sodium tripolyphosphate and 80% of commercial sodium dithionite, the mixture heats up at the point at which the water is added to 120° C. in fifty minutes. Dilution of the dithionites with these inert salts is moreover undesirable because the effective bleaching activity is lessened accordingly.

The object of the present invention is to stabilize dithionites without impairing their efficiency, i.e., to remove the risk from the storage and handling of dithionites which are used in large amounts in many industries.

We have found that, surprisingly, mixtures of major amounts of dithionites and minor amounts of dry powder of readily water-soluble macromolecular substances which form highly viscous solutions with small amounts of water and which will not react chemically with dithionites under the conditions of storage and transportation, are substantially more resistant to the influence of water and moisture than dithionites in pure form or in technical grades not containing the said additives.

Examples of macromolecular substances which fall within the said definition are homopolymers and copolymers of the type of poly(meth)acrylic acid, poly(meth)-acrylamide, polyvinyl alcohol, polyethylenimine, polyvinylpyrrolidone and water-soluble polyacetals. These polymers contain the following units as characteristic building blocks:

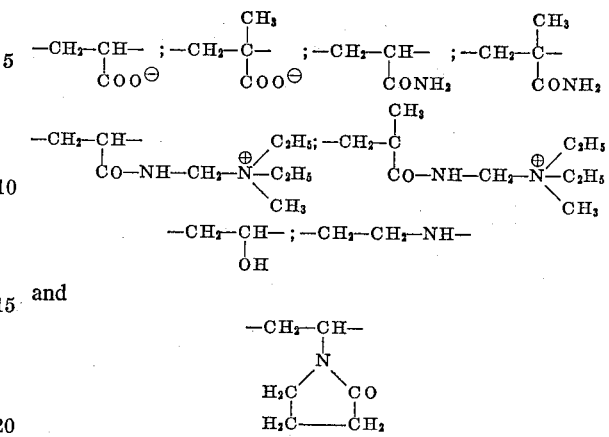

and

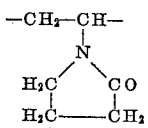

Other suitable substances are cellulose derivatives and related substances, as for example water soluble starch, sodium alginate, carboxymethylcellulose and high molecular weight proteins such as gelatins. Provided the macromolecular substances serving as stabilizers fulfill the said conditions, their chemical nature has no appreciable effect on their usefulness; for example they may be nonionic, anionic or (inter alia owing to quaternary groups) cationic, for example as in the case of diethylaminomethylene(meth)acrylamide which has been quaternized with dimethyl sulfate; they may furthermore be of synthetic or natural origin and modified natural products.

The above examples of suitable water-soluble macromolecular substances are given merely for the purpose of illustration and with a knowledge of the present specification those skilled in the art will have no difficulty in choosing other water-soluble macromolecular substances.

It is important that the macromolecular stabilizers should be in a state of fine division and also dry and that they should be uniformly distributed in the mixtures. The amounts required for stabilization are between about 1 and 5%, preferably 1 and 2%, with reference to the weight of the mixtures.

The stabilizers may be uniformly distributed in the salts or salt mixtures by conventional mixing methods; it is advantageous to work with the substantial exclusion of moisture.

Stable mixtures according to this invention yield for example alkali metal salts, the ammonium salt and the zinc salt of dithionous acid $H_2[O_2S—SO_2]$. These salts are also known as hydrosulfites although this is at variance with the constitution of the salts. Mixtures having sodium dithionite as the main component are of particular technical importance. They may also contain other components (besides the dithionite and the macromolecular substance), for example carbonates, sulfates and polyphosphates.

The following examples will further illustrate this invention.

*Example 1*

(a) *Blank test.*—4 ml. of water is added dropwise to 200 g. of 95% commercial sodium dithionite in a 200 ml. beaker. Measured at intervals of ten minutes, the temperature rises from room temperature to 45° C. (after ten minutes), 67° C., 112° C., 132° C., 148° C., 280° C., 290° C., 285° C. (after eighty minutes), the temperature of 290° C. after seventy minutes being the maximum value. Ignition for a short time occurs after fifty-six minutes; this explains the sudden marked rise in temperature.

(b) *Behavior of a mixture according to the invention.*—Sodium dithionite of the same quality as used under (a) is intimately mixed with 4 g. of a very finely powdered sodium polyacrylate having a K-value of 180 and then subjected to the same treatment as under (a). The maximum temperature is 130° C. to 135° C. after about forty minutes; there is no local ignition of the mixture. The same result is obtained when the experiment is repeated several times.

*Example 2*

(a) *Blank test.*—3 ml. of water is added dropwise to 100 g. of a 90% anhydrous commercial sodium dithionite in the way described in Example 1. The maximum temperature of 140° C. is reached after fifty minutes.

(b) *Behavior of a mixture according to the invention.*—Sodium dithionite of the same quality as in the preceding paragraph is intimately mixed with 1 g. of a finely powdered polyacrylamide having a K-value of 185 and then treated with water as in the preceding paragraph. The temperature rises to a maximum of 116° C. within forty-five minutes; repeating the test many times gives the same result.

(c) *Behavior of another mixture according to the invention.*—1 g. of a copolymer from 70 parts of acrylamide and 30 parts of a diethylaminomethylenemethacrylamide which has been quaternized with dimethyl sulfate is used instead of the polyacrylamide in the preceding paragraph. The maximum temperature of 120° C. is reached after sixty minutes.

We claim:
1. A dry mixture consisting essentially of
   (a) 95 to 99% by weight of a dithionite selected from the group consisting of sodium dithionite and zinc dithionite and, as a stabilizer for said dithionites to prevent decomposition under the influence of water and moisture,
   (b) 1 to 5% by weight of a water-soluble, macromolecular polymer containing the following units as building blocks:

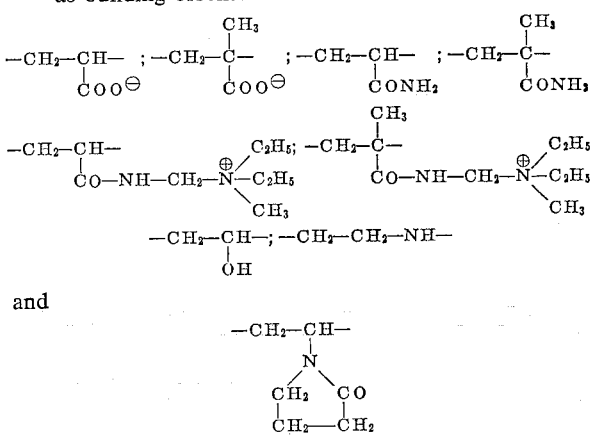

2. A dry mixture as in claim 1 wherein component (b) is selected from the group consisting of polyacrylic acid, sodium polyacrylate, polyacrylamide, polyvinyl alcohol, and polyvinylpyrrolidone.

References Cited by the Examiner
UNITED STATES PATENTS

| | | | |
|---|---|---|---|
| 861,218 | 7/1907 | Majert | 252—397 XR |
| 2,472,684 | 6/1949 | Rossi | 252—105 |
| 2,902,453 | 9/1959 | Matlin | 252—105 |
| 3,074,774 | 1/1963 | Sapers | 252—105 XR |
| 3,183,191 | 5/1965 | Hach | 252—105 |

LEON D. ROSDOL, *Primary Examiner.*

JULIUS GREENWALD, ALBERT T. MEYERS,
*Examiners.*

M. WEINBLATT, *Assistant Examiner.*